United States Patent
Blasko

(10) Patent No.: US 10,320,306 B1
(45) Date of Patent: Jun. 11, 2019

(54) MATRIX CONVERTER SYSTEM WITH CURRENT CONTROL MODE OPERATION

(71) Applicant: Hamilton Sundstrand Corporation, Charlotte, NC (US)

(72) Inventor: Vladimir Blasko, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 99 days.

(21) Appl. No.: 15/852,154

(22) Filed: Dec. 22, 2017

(51) Int. Cl.
*H02M 1/42* (2007.01)
*H02M 1/44* (2007.01)
*H02M 5/29* (2006.01)
*H02M 5/45* (2006.01)
*H02M 1/088* (2006.01)
*H02M 5/293* (2006.01)

(52) U.S. Cl.
CPC .......... *H02M 5/293* (2013.01); *H02M 1/088* (2013.01); *H02M 1/42* (2013.01); *H02M 5/29* (2013.01); *H02M 5/45* (2013.01); *H02M 1/44* (2013.01)

(58) Field of Classification Search
CPC ...................................................... H02M 5/29
See application file for complete search history.

(56) References Cited

U.S. PATENT DOCUMENTS

| | | | |
|---|---|---|---|
| 6,163,472 A | 12/2000 | Colby | |
| 6,862,163 B2 | 3/2005 | Schierling et al. | |
| 8,259,474 B2 | 9/2012 | Blasko | |
| 8,310,214 B2 | 11/2012 | Rivera et al. | |
| 8,629,637 B2 | 1/2014 | Blasko et al. | |
| 9,219,424 B2 | 12/2015 | Inomata et al. | |
| 2009/0302678 A1* | 12/2009 | Kokubun | H02J 7/1492 307/9.1 |
| 2011/0292697 A1* | 12/2011 | Alexander | H02M 5/275 363/37 |
| 2015/0188443 A1* | 7/2015 | Takeda | H02M 5/293 416/146 R |
| 2017/0160760 A1 | 6/2017 | Blasko | |
| 2017/0324333 A1* | 11/2017 | Xiao | H02M 1/12 |

* cited by examiner

*Primary Examiner* — Jue Zhang
*Assistant Examiner* — Trinh Q Dang
(74) *Attorney, Agent, or Firm* — Kinney & Lange, P.A.

(57) ABSTRACT

A matrix converter system and control method includes a matrix converter, a generator, a plurality of output capacitors, and a controller. The matrix converter includes a plurality of switches and is connected between a multiphase input and a multiphase output. The plurality of output capacitors are connected between the multiphase output and ground. The generator is connected to the multiphase input and includes internal inductances. The controller is configured to control the plurality of switches to control active current and reactive current from the generator based on the internal inductances of the generator. The active and reactive currents are controlled to charge the plurality of output capacitors. The matrix converter operates in a current control mode and is able to boost output voltage above the input voltage level.

16 Claims, 6 Drawing Sheets

MATRIX CONVERTER SYSTEM WITH CURRENT CONTROL MODE OPERATION

BACKGROUND

The present invention relates generally to matrix converters, and in particular to a current control mode for a matrix converter.

Matrix converters are generally used as alternating current (AC)-to-AC converters that receive a multiphase input and produce a multiphase output. Traditional matrix converters operate in voltage control mode (VCM) such that the output voltage is controlled directly based upon the input voltage. In systems that utilize VCM, input inductor-capacitor (LC) circuits are implemented at the input of the matrix converter. The input LC circuit generally includes capacitors connected between each phase of the input. These capacitors create low impedance paths between phases and thus, the matrix converter cannot be controlled to provide short circuits between input phase lines without risking damage to the switching elements. Because the matrix converter cannot create output voltages higher than the line-to-line input voltages, the matrix converter is never able to provide an output voltage that is greater than 86.6% of the input voltage without distortion.

SUMMARY

In one embodiment, a matrix converter system includes a matrix converter, a generator, a plurality of output capacitors, and a controller. The matrix converter includes a plurality of switches and is connected between a multiphase input and a multiphase output. The plurality of output capacitors are connected between the multiphase output and ground. The generator is connected to the multiphase input and includes internal inductances. The controller is configured to control the plurality of switches to control active current and reactive current from the generator based on the internal inductances of the generator. The active and reactive currents are controlled to charge the plurality of output capacitors.

In another embodiment, a matrix converter includes a plurality of switches and is connected to receive power from a generator at a multiphase input of the matrix converter, and wherein a plurality of capacitors are connected to a multiphase output of the matrix converter. A method of controlling the matrix converter includes controlling, by a controller, the plurality of switches to generate reactive current using internal inductances of the generator; controlling, by the controller, the plurality of switches to generate active current using voltage on the multiphase output; and controlling, by the controller, the plurality of switches to control the voltage on the multiphase output based on the active current and the reactive current.

DETAILED DESCRIPTION

A matrix converter system is disclosed herein that operates in a current control mode (CCM). The matrix converter does not include an inductor-capacitor (LC) input filter and thus, there are no line-to-line capacitors on the input side of the matrix converter. The input of the matrix converter is connected to receive power from a multiphase generator. The generator includes internal inductances on each phase. Capacitors are connected between each output phase of the matrix converter and ground.

The matrix converter system is capable of operating in a boost mode. When the voltage on the output capacitors is relatively small, the switches of the converter may be operated to short phase lines to generate energy within the internal inductances of the generator. This is possible due to the absence of the LC circuit at the input, which removes the low impedance line-to-line capacitors. Upon generation of energy within the internal inductances of the generator, the switches of the matrix converter may then be controlled to provide current to charge the output capacitors using the generated energy stored in the inductances of the generator. This way, the output capacitors may be charged to a voltage greater than that of the input voltage. Once the voltage on the output capacitors is sufficient, the matrix converter may be controlled normally to control the output to a load.

Figure 1:
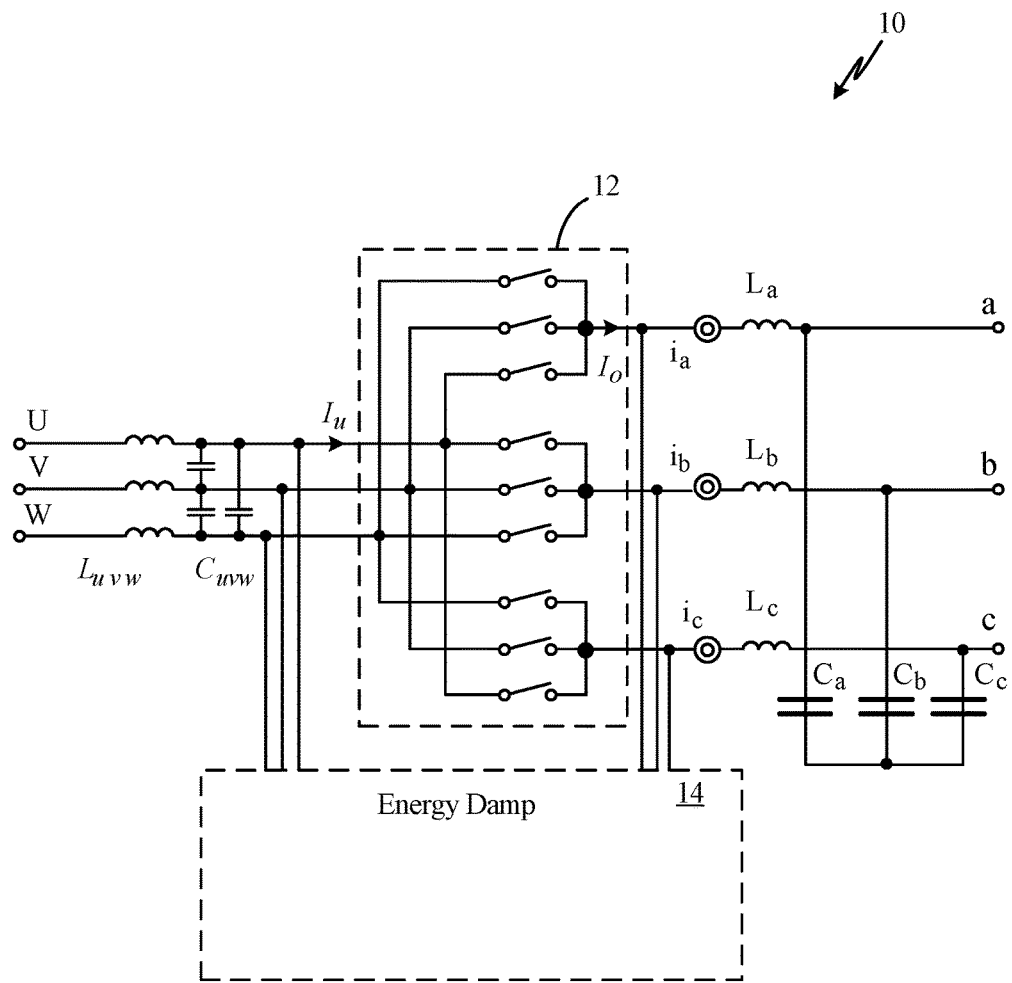
FIG. 1 is a circuit diagram illustrating a prior art matrix converter system.

FIG. 1 is a circuit diagram illustrating a prior art matrix converter system 10 that includes matrix converter 12. Matrix converter 12 includes twelve switches and receives three phases (U, V, W) of input power. Capacitors $C_{uvw}$ are connected between phases (U, V, W), and each phase (U, V, W) has an inductor $L_{uvw}$ to form an LC input filter. Each input phase (U, V, W) is connected to each output phase (a, b, c) through matrix converter 12. The switches of matrix converter 12 are controlled to convert input power on input phases (U, V, W) to output power on the output phases (a, b, c). Each output phase has an inductor $L_{abc}$. Capacitors $C_a$, $C_b$, and $C_c$ are connected between a respective output phase (a, b, c) and a common node to form an LC filter on the output of matrix converter 12. Damp circuit 14 is utilized to provide a path for energy stored in input inductors $L_{uvw}$ and output inductors $L_{abc}$ upon shutdown of matrix converter 12. In the embodiment illustrated in FIG. 1, system 10 is configured to provide an AC-AC voltage conversion that provides three phase smooth voltage on the output phases (a, b, c). However, in other embodiments, such as motor control applications, a motor can tolerate discontinuous voltages and therefore, motor windings can be directly connected to the output of matrix converter 12. The internal inductances of the motor can reduce or eliminate the need for inductors $L_{abc}$.

Matrix converter 12 is operated in a voltage control mode (VCM) such that the output voltage on lines (a, b, c) is controlled and limited by the available input voltage on lines (U, V, W). Because of capacitors $C_{uvw}$, there exists a low impedance path between each of the input phase lines (U, V, W). Because of this, the switches of matrix converter 12 cannot be controlled to provide a short circuit between any of phase lines (U, V, W). If a short circuit were created, the low impedance path created by capacitors $C_{uvw}$ would create a large current, risking damage to the switches. Because there are no energy storage devices present in system 10 to boost voltage during conversion, the analysis has shown that VCM for system 10 can only achieve, at best, 86.6% of the input voltage at the output.

Figure 2:
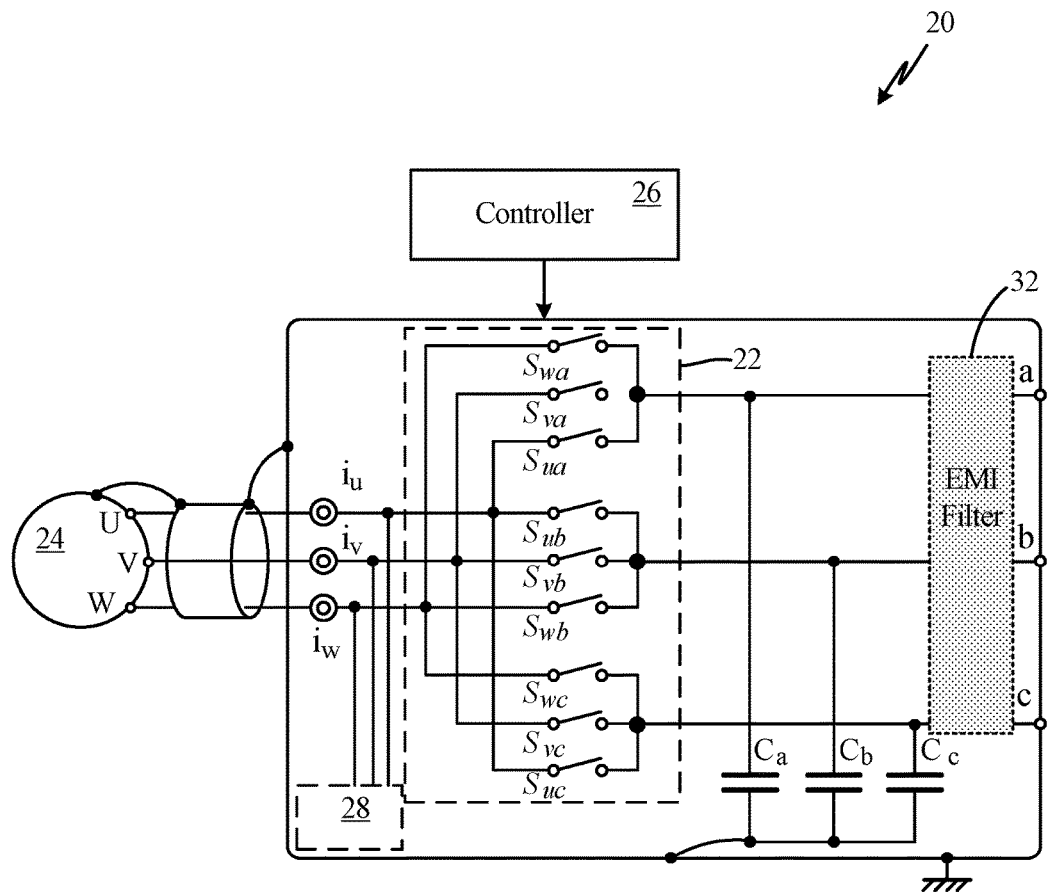
FIG. 2 is a circuit diagram illustrating a matrix converter system that utilizes a current control mode.

FIG. 2 is a circuit diagram illustrating matrix converter system 20 capable of operation in a current control mode (CCM). Matrix converter system 20 includes matrix converter 22 connected to receive input power from three-phase generator 24 on input phases (u, v, w). Matrix converter 22 include switches $S_{ua}$, $S_{ub}$, $S_{uc}$, $S_{va}$, $S_{vb}$, $S_{vc}$, $S_{wa}$, $S_{wb}$, and $S_{wc}$ (hereinafter "$S_{ua}$-$S_{wc}$") that each receive control from controller 26. Capacitors $C_a$, $C_b$, and $C_c$ are connected to the three respective output phases (a, b, c) of matrix converter 22. Damp circuit 28 (illustrated in further detail in FIG. 3C) is connected to the three phase inputs of matrix converter 22. Generator 24 is connected directly to matrix converter 22 through grounded sheath 30. An electromagnetic interference (EMI) filter 32 is connected to the output of matrix converter 22 to provide further filtering for system 20. While illustrated as three input phases (u, v, w) and three output phases (a, b, c), any number of input phases and any number of output phases may be connected through matrix converter 22.

Matrix converter system 20 does not include inductors $L_{u,v,w}$ and $L_{a,b,c}$ (FIG. 1) nor does system 20 include capacitors $C_{u,v,w}$ (FIG. 1) at the input of matrix converter 22. By eliminating the capacitors at the input of matrix converter 22, the low impedance paths between phases (u, v, w) on the input side of matrix converter 22 are eliminated. The internal inductances of generator 24 create high impedances and thus, switches $S_{ua}$-$S_{wc}$ may be controlled such that phase-to-phase short circuits are created without the risk of generating damaging overcurrents. This allows system 20 to utilize the internal inductances of generator 24 to generate reactive currents, which can be utilized to charge output capacitors $C_a$, $C_b$, and $C_c$. This allows matrix converter system 20 to operate in a boost mode, generating currents to charge capacitors $C_a$, $C_b$, and $C_c$ when the voltage on output phases (a, b, c) is relatively small. Thus, system 20 is able to overcome the 86.6% input-to-output voltage limit of prior art system 10.

Controller 26 may control matrix converter 22 using a pulse-width modulation (PWM) control scheme, for example. Controller 26 may observe the current on input phases (u, v, w) and the voltage on output phases (a, b, c) to control matrix converter 22. Controller 26 may select a desired output frequency that is independent of the input frequency. For example, the output may be a three-phase AC output at a frequency greater than, or less than, that of generator 24. Generator 24 may also be a variable frequency generator, such that the frequency is at times greater than the output frequency, and at times less than the output frequency. The output frequency may also be selected to be zero, allowing for matrix converter 22 to generate a DC output from the AC input.

During operation of system 20, when the output voltage is sufficiently high, the operation of matrix converter 22 may be similar to that of system 10. However, when the system is starting up, or if the voltage on the output phases (a, b, c) becomes relatively small, controller 26 may control matrix converter 22 in a boost mode in order to boost the voltage on output phases (a, b, c). To do this, controller 26 may control select switches ($S_{ua}$-$S_{wc}$) to provide one or more short circuit paths between input phases (u, v, w). These short circuit paths rely on the high impedances created by the internal inductance of generator 24. During the short circuit condition, energy is generated within the internal inductances of generator 24. After a selected time, switches ($S_{ua}$-$S_{wc}$) are controlled to remove the short circuit, and utilize the energy stored in the internal inductances of generator 24 to direct current to charge capacitors $C_a$, $C_b$, and $C_c$, which allows system 20 to create output voltages greater than the input voltages.

Figure 3A:
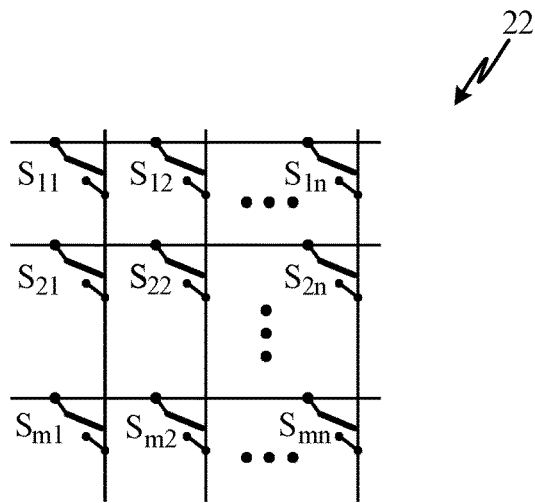
FIGS. 3A-3C are circuit diagrams illustrating a switch matrix, a bidirectional switch, and a damping circuit, respectively, for the matrix converter system of FIG. 2.
Figure 3B:
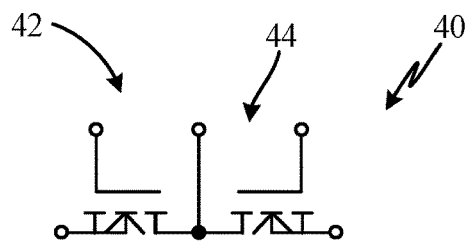

FIGS. 3A-3B are circuit diagrams illustrating a switch matrix for matrix converter 22, a bidirectional switch 40, and damp circuit 28, respectively. FIG. 3A illustrates an embodiment of matrix converter 22. As illustrated in FIG. 3A, matrix converter 22 may have any number (n) of input phases, and any number (m) of output phases. In the embodiment illustrated in FIG. 2, matrix converter has three input phases (n=3) and three output phases (m=3). As illustrated in FIG. 3A, matrix converter system 20 may be configured to generate any number of output phases from any number of input phases.

FIG. 3B illustrates bidirectional switch 40. In prior art systems, matrix converters included bidirectional switches implemented using insulated gate bipolar transistors (IGBTs), for example. The use of IGBTs required the use of diodes to properly achieve bidirectional power flow. Bidirectional switch 40, in contrast, uses metal-oxide-semiconductor field-effect transistors (MOSFETs) 42 and 44, which may be silicon carbide (SiC) MOSFETs, for example. MOSFETs are channel devices that do not require the use of external diodes, as the internal channels of the MOSFET accomplish this task. Thus, bidirectional switch 40 may be accomplished by connecting the drains of MOSFETs 42 and 44. By using MOSFETs, the conduction loss of the bidirectional switch may be reduced.

Figure 3C:
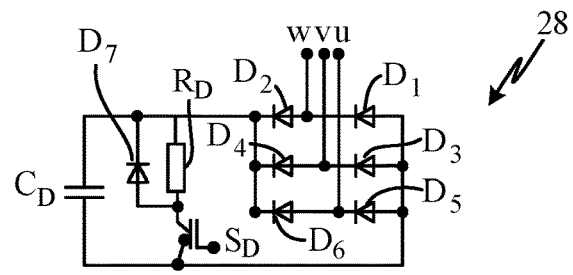

FIG. 3C illustrates an embodiment of damp circuit 28. As seen in FIG. 2, and in contrast to system 10 of FIG. 1, damp circuit 28 is only connected to the input side of matrix converter 22. This is due to the absence of inductors $L_a$, $L_b$, and $L_c$ (FIG. 1) from system 20. Damp circuit 28 is configured such that if there is a disruption of current flow, the energy stored in the internal inductances of generator 24 has a path. Damp circuit 28 includes diodes $D_1$-$D_7$, capacitor $C_D$, resistor $R_D$, and switch $S_D$. Diodes D1-D6 form a rectifier circuit. The energy stored in the internal inductances of generator 24 upon shutdown of matrix converter 22, for example, flows through the rectifier circuit and charges capacitor $C_D$. Switch $S_D$ may then be controlled to discharge capacitor $C_D$ through resistor $R_D$.

Figure 4A:
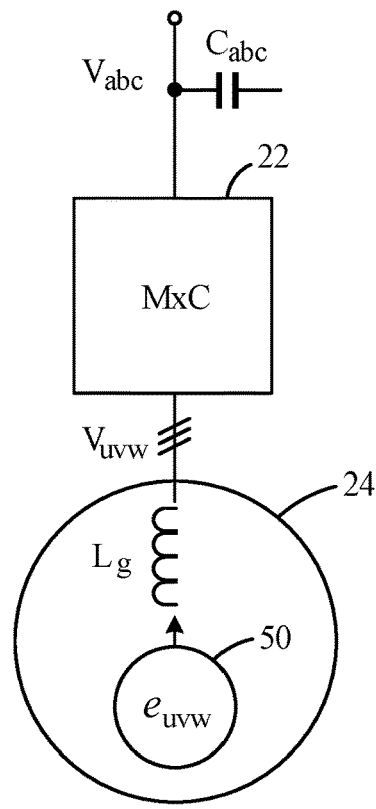
FIG. 4A is a line diagram illustrating a back electromotive force (EMF) of a generator connected to an input of a matrix converter.
Figure 4B:
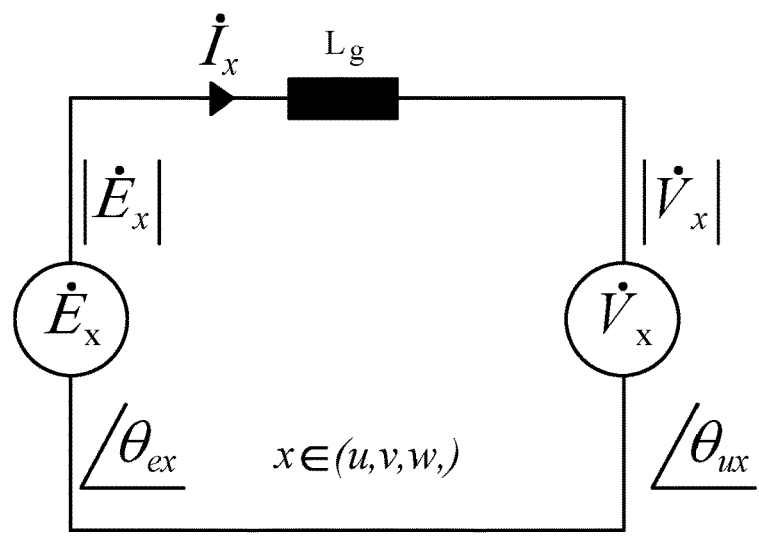
FIG. 4B is a line diagram illustrating a balance between the back EMF of a generator and an input voltage of a matrix converter system.
Figure 4C:
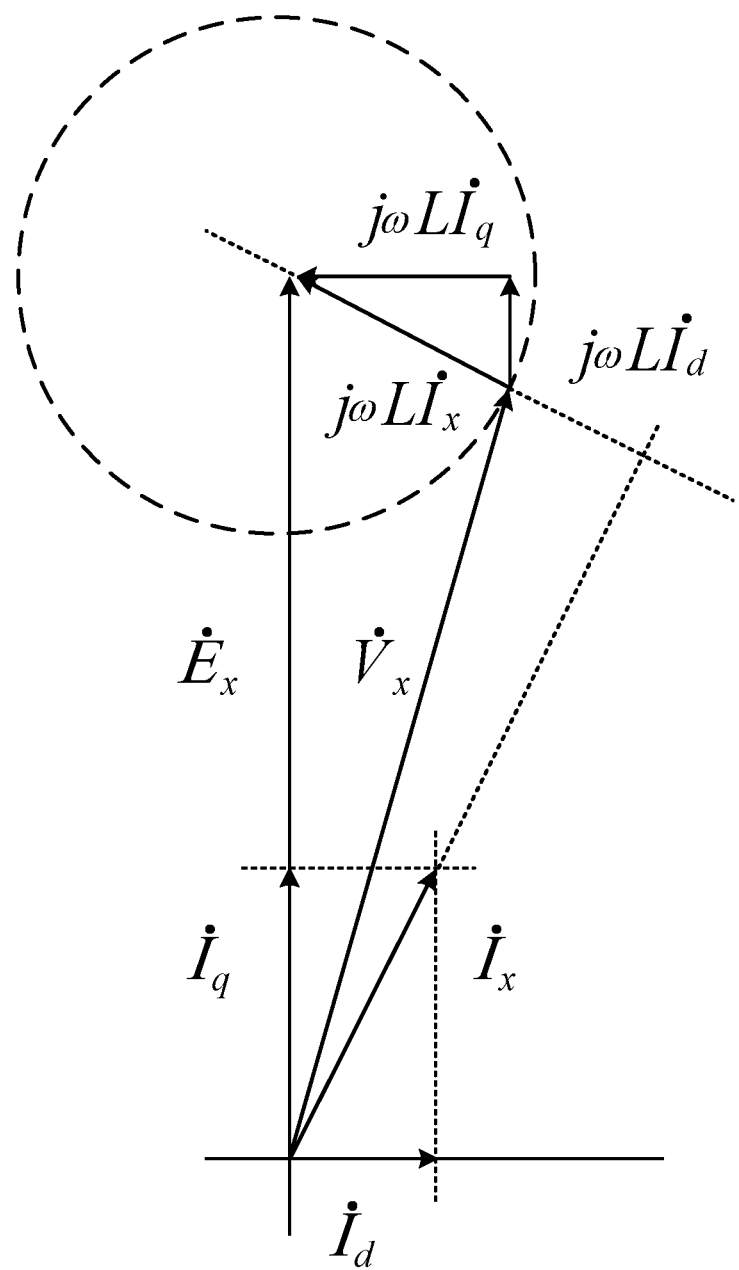
FIG. 4C is a phasor diagram illustrating vectors for back EMF voltage of a generator, the voltage at the input to a matrix converter, and active and reactive currents from the generator.

FIGS. 4A-4C are diagrams illustrating voltage and current relationships within system 20. FIG. 4A is a line diagram illustrating a back electromotive force (EMF) 50 of generator 24 connected to the input of matrix converter 22. FIG. 4B is a line diagram illustrating a balance between the back EMF voltage $E_x$ of generator 24 and input voltage $V_x$ to matrix converter 22. FIG. 4C is a phasor diagram illustrating vectors for back EMF voltage $\dot{E}_x$ of a generator, the voltage $\dot{V}_x$ at the input to a matrix converter, and active $\dot{I}_q$ and reactive $\dot{I}_d$ currents from generator 24. FIGS. 4A-4C will be discussed together.

Generator 24 produces back EMF 50 ($e_{uvw}$) and has internal inductances $L_G$. Voltage ($v_{uvw}$) at the output of generator 24 is provided to matrix converter 22. The voltage across capacitors $C_{abc}$ ($v_{abc}$) is the output voltage of matrix converter 22. For CCM, controller 26 operates to control input voltage ($v_{uvw}$) to control current through matrix converter 22. This relationship is seen in FIG. 4B. $\dot{E}_x$ designates the voltage vector for the voltage of back EMF 50 ($e_{uvw}$). $\dot{V}_x$ designates the voltage vector for the input voltage ($v_{uvw}$) to matrix converter 22. $\dot{I}_x$ designates the current vector for current flowing through internal inductances $L_G$. Thus, to control current flow in input phases (u, v, w), controller 26 may control the input voltage ($v_{uvw}$). For example, if the input voltage vector $\dot{V}_x$ is equal to the back EMF vector $\dot{E}_x$, no current will be flowing to the input of matrix converter 22.

FIG. 4C is a phasor diagram illustrating the relationship of the back EMF voltage ($e_{uvw}$) and the input voltage ($v_{uvw}$). FIG. 4C includes phasors $\dot{E}_x$, $\dot{V}_x$, and $\dot{I}_x$. $\dot{I}_x$ is the product of the active current phasor $\dot{I}_q$ and the reactive current phasor $\dot{I}_d$, which are 90° out of phase. The active current phasor $\dot{I}_q$ is in phase with the back EMF voltage $\dot{E}_x$. The voltage drop across the internal inductance $L_G$ ($j\omega L \dot{I}_x$) balances the input voltage $\dot{V}_x$ with the back EMF voltage $\dot{E}_x$. The voltage drop across inductor $L_G$ ($j\omega L \dot{I}x$) is the result of the voltage drop due to the active current ($j\omega L \dot{I}_q$) and due to the reactive current ($j\omega L \dot{I}_d$). Thus, as can be seen in FIGS. 4B and 4C, $\dot{V}_x$ can be controlled to control the current $\dot{I}_x$ to matrix converter 22. As seen in FIG. 4A, $v_{uvx}$ can be controlled, in part, by controlling switch matrix 22 to connect $v_{abc}$ on the output phases (a, b, c) to the input phases (u, v, w).

Figure 5:
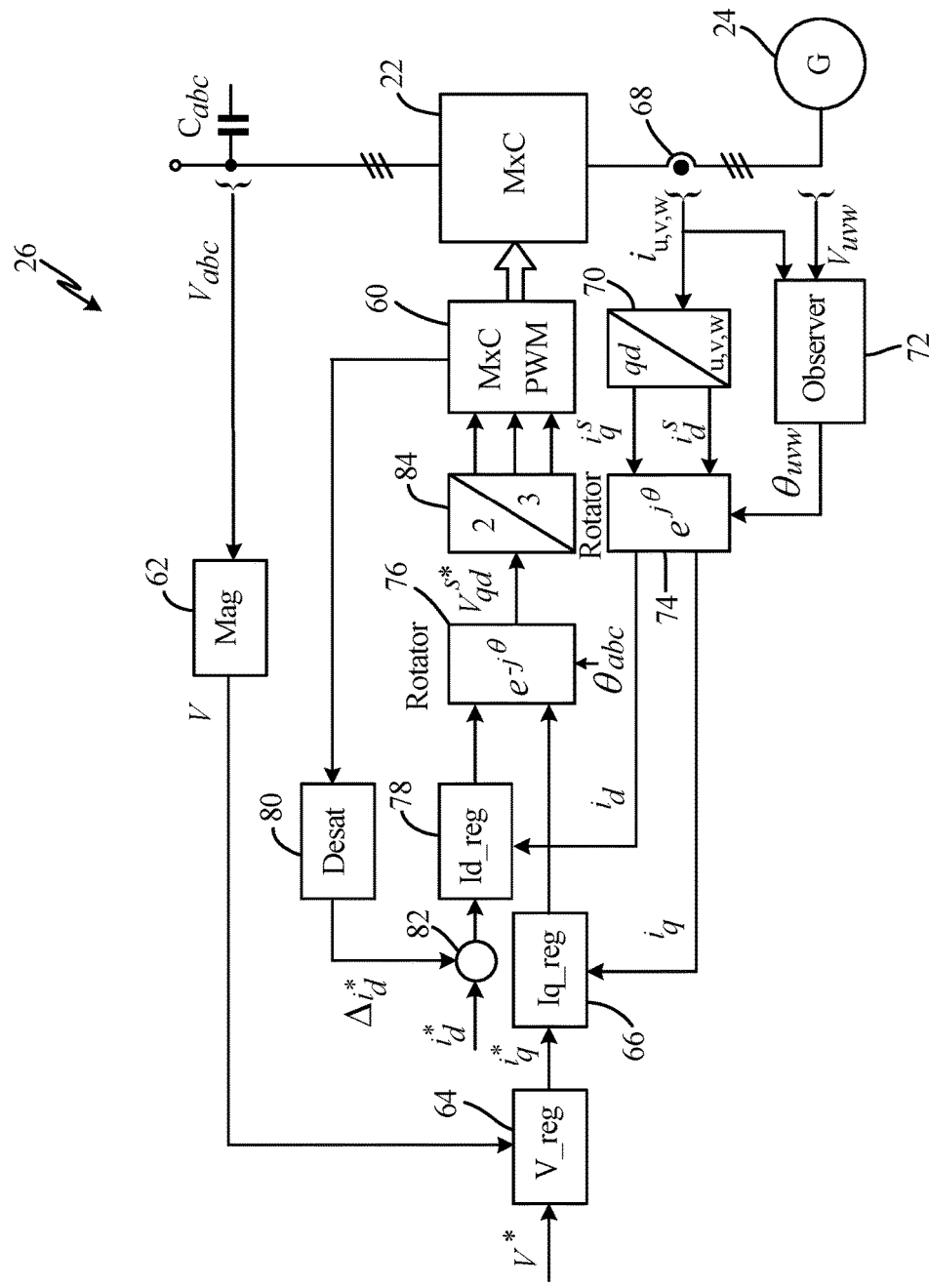
FIG. 5 is a block diagram illustrating a controller for controlling a matrix converter using a current control mode.

FIG. 5 is a block diagram illustrating a portion of controller 26 for controlling matrix converter 22 using CCM. Controller 26 includes PWM control circuit 60, magnitude block 62, voltage regulator 64, active current regulator 66, current sensors 68, transform block 70, observer 72, rotators 74 and 76, reactive current regulator 78, desaturation block 80, adder 82, and transform block 84. Switches $S_{ua}$-$S_{wc}$ of matrix converter 22 are controlled by signals output from PWM control circuit 60. PWM control circuit 60 implements a matrix converter PWM algorithm such as, for example, space-vector control with triangle comparison, or any other PWM algorithm for matrix converter 22.

The output voltage ($v_{abc}$) of matrix converter 22 is sampled by magnitude block 62. Magnitude block 62 is any analog or digital circuit or device capable of outputting a voltage value (V) indicative of the magnitude of voltage at capacitors $C_a$, $C_b$, and $C_c$. The input voltage ($v_{uvw}$) of matrix converter 22 is sampled at the output of generator 24 and provided to observer 72. Current ($i_{uvw}$) is sampled by current sensors 68 at the output of generator 24 and also provided to observer 72. Observer 72 is a circuit capable of determining an angular position of generator 24 based upon the sampled voltage ($v_{uvw}$) and current ($i_{uvw}$). Sampled current ($i_{uvw}$) is also provided to transform circuit 70.

Transform circuit 70 performs an abc-to-dq transformation to convert the three-phase signal into two DC-like signals ($i_q^s$ and $i_d^s$, hereinafter referred to as "static DC signals"). The static DC signals ($i_q^s$ and $i_d^s$) are provided to rotator 74, which uses the angular position ($\theta_{uvw}$) of generator 24 to rotate the two static DC signals ($i_q^s$ and $i_d^s$) to generate active current reference ($i_q$) and reactive current reference ($i_d$). These signals are indicative of the present active and reactive currents in generator 24. Thus, controller 26 receives a reference output voltage magnitude (V), a reference active current ($i_q$), and a reference reactive current ($i_d$).

Controller 26 generates a control vector V* that represents a desired output voltage ($v_{abc}$). The output voltage magnitude (V) is provided to voltage regulator 64. Using the control input (V*) and the measured voltage magnitude (V), voltage regulator 64 generates a current indicative of the difference between the output voltage magnitude (V) and the control input (V*). Because the active current ($i_q$), as illustrated in FIG. 4C, is in phase with the back EMF voltage of generator 24, the output of voltage regulator 64 is an active current control signal ($i_q^*$). The active current control signal ($i_q^*$) is provided to active current regulator 66.

Active current regulator 66 receives the active current feedback ($i_q$) and the active current control signal ($i_q^*$). Active current regulator 66 generates a voltage indicative of the difference between the active current feedback ($i_q$) and the active current control signal ($i_q^*$) and provides the voltage to rotator 76.

PWM control circuit 60 provides an output signal to desaturation block 80. The output signal is indicative of saturation of the PWM algorithm. For example, if the output voltage ($v_{abc}$) has become small compared to the input voltage ($v_{uvw}$), the PWM algorithm may no longer be able to control the input voltage ($v_{uvw}$) using the output voltage ($v_{abc}$), resulting in saturation of the PWM algorithm. In this scenario, matrix converter 22 will need to be controlled to generate some reactive current in generator 24 to increase the output voltage ($v_{abc}$) to pull the PWM algorithm out of saturation. Thus, desaturation block 80 is configured to output a control signal indicative of the desired change in reactive current ($\Delta i_d^*$).

Controller 26 also generates a reactive current control signal ($i_d^*$) indicative of a desired reactive current. This may be done while matrix converter system 20 is operating in a boost mode, for example, such as during startup of generator 24. Adder 82 is used to adjust the reactive current control signal ($i_d^*$) based on the desired change in reactive current ($\Delta i_d^*$) from desaturation block 80. The output of adder 82 is provided to reactive current regulator 78. Reactive current regulator 78 generates a voltage indicative of the difference between the reactive current feedback ($i_d$) and the reactive current control signal from adder 82, and provides the voltage to rotator 76.

Rotator 76 receives the two static voltages from regulators 66 and 78. Rotator 78 also receives a control angular position ($\theta_{abc}$). Controller 26 uses the control angular position ($\theta_{abc}$) to control the frequency of the output voltage ($v_{abc}$). Rotator 76 outputs two static voltages and provides the two static voltages to transform block 84. Transform block 84 performs a dq-to-abc transformation on the two static voltages to generate three-phase signals for PWM control circuit 60. PWM control circuit 60 then uses the three-phase signals to control matrix converter 22.

As discussed above, if the desired reactive current is non-zero, PWM control circuit 60 may control some of switches $S_{ua}$-$S_{wc}$ to create line-to-line short circuits in order to generate the desired amount of reactive current. Then, to supply the desired amount of active current, PWM control circuit 60 may control switches $S_{ua}$-$S_{wc}$ to control the input voltage ($v_{uvw}$) based on the output voltage ($v_{abc}$) in order to control the active current.

Matrix converter system 20 has several advantages over matrix converter system 10. By controlling matrix converter system 20 using CCM, the input LC circuit may be removed, and the output inductors may also be removed. This reduces the size and weight of the matrix converter system. Matrix converter system 20 is also able to operate in a boost mode, allowing output voltage operation above 86.6% of the input voltage which has been a major drawback in previous matrix converter system design.

DISCUSSION OF POSSIBLE EMBODIMENTS

The following are non-exclusive descriptions of possible embodiments of the present invention.

A matrix converter system includes a matrix converter, a generator, a plurality of output capacitors, and a controller. The matrix converter includes a plurality of switches and is connected between a multiphase input and a multiphase output. The plurality of output capacitors are connected between the multiphase output and ground. The generator is connected to the multiphase input and includes internal inductances. The controller is configured to control the plurality of switches to control active current and reactive current from the generator based on the internal inductances of the generator. The active and reactive currents are controlled to charge the plurality of output capacitors.

The system of the preceding paragraph can optionally include, additionally and/or alternatively, any one or more of the following features, configurations and/or additional components:

A further embodiment of the foregoing system, wherein the controller comprises a pulse-width modulation circuit configured to execute a pulse width modulation algorithm to generate switch control signals for the plurality of switches to control the active current and the reactive current from the generator.

A further embodiment of any of the foregoing systems, wherein the controller is further configured to generate a desired voltage magnitude and a desired reactive current, and wherein the controller further includes a first regulator configured to receive the desired voltage magnitude and an observed voltage magnitude, wherein the observed voltage magnitude is a magnitude of a voltage on the multiphase output, and wherein the first regulator circuit is configured to output a desired active current.

A further embodiment of any of the foregoing systems, wherein the pulse-width modulation circuit is further configured to output a signal indicative of saturation of the pulse-width modulation algorithm, and wherein the controller further includes a desaturation module configured to generate a reference delta reactive current based on the signal indicative of saturation; an adder configured to output a reactive current command based on the desired reactive current and the reference delta reactive current; a second regulator configured to receive the reactive current command and an observed reactive current, and generate a reactive current voltage; and a third regulator configured to receive the desired reactive current and an observed active current, and generate an active current voltage.

A further embodiment of any of the foregoing systems, wherein the multiphase input is a three-phase input, and wherein the controller further includes an observer configured to determine a generator phase angle; a first converter configured to convert a sensed three-phase current on the three-phase input into two static direct current signals; and a first rotator configured to output the observed active current and the observed reactive current based on the two static direct current signals and the generator phase angle.

A further embodiment of any of the foregoing systems, wherein the controller further includes a second rotator configured to output a static voltage reference based on the reference active voltage, the reference reactive voltage, and a reference phase angle; and a second converter configured to convert the static voltage reference into a three-phase reference voltage, wherein the pulse-width modulation algorithm utilizes the three-phase reference voltage to generate the switch control signals.

A further embodiment of any of the foregoing systems, wherein the reference phase angle is selected based on a desired output frequency of the matrix converter.

A further embodiment of any of the foregoing systems, wherein each of the plurality of switches is a bidirectional switch comprising first and second power metal-oxide-semiconductor field-effect transistors.

A further embodiment of any of the foregoing systems, further comprising an energy damp circuit connected only to the multiphase input.

A further embodiment of any of the foregoing systems, wherein there are no capacitors connected between any phases of the multiphase input.

A method of controlling a matrix converter, wherein the matrix converter includes a plurality of switches and is connected to receive power from a generator at a multiphase input of the matrix converter, and wherein a plurality of capacitors are connected to a multiphase output of the matrix converter, the method including controlling, by a controller, the plurality of switches to generate reactive current using internal inductances of the generator; controlling, by the controller, the plurality of switches to generate active current using voltage on the multiphase output; and controlling, by the controller, the plurality of switches to control the voltage on the multiphase output based on the active current and the reactive current.

The method of the preceding paragraph can optionally include, additionally and/or alternatively, any one or more of the following features, configurations and/or additional components:

A further embodiment of the foregoing method, wherein controlling, by the controller, the plurality of switches to generate reactive current includes controlling the plurality of switches to provide short circuit connections between phases of the multiphase input.

A further embodiment of any of the foregoing methods, wherein controlling, by the controller, the plurality of switches to control the voltage on the multiphase output includes controlling, by a pulse-width modulation circuit, the plurality of switches using a pulse-width modulation algorithm.

A further embodiment of any of the foregoing methods, wherein controlling, by the controller, the plurality of switches to control the voltage on the multiphase output further includes generating, by the controller, a desired voltage magnitude and a desired reactive current; sampling, by the controller, an observed voltage magnitude on the multiphase output of the matrix converter; receiving, by a first regulator, the desired voltage magnitude and the observed voltage magnitude; and generating, by the first regulator, a desired active current.

A further embodiment of any of the foregoing methods, wherein controlling, by the controller, the plurality of switches to control the voltage on the multiphase output further includes generating, by the pulse-width modulation circuit, a signal indicative of saturation of the pulse-width modulation algorithm; generating, by a desaturation module, a reference delta reactive current based on the signal indicative of saturation; generating, by an adder, a reactive current command based on the desired reactive current and the reference delta reactive current; generating, by a second regulator, a reactive current voltage using the reactive current command and an observed reactive current; and generating, by a third regulator, an active current voltage using the desired reactive current and an observed active current.

A further embodiment of any of the foregoing methods, wherein the multiphase input is a three-phase input, and wherein controlling, by the controller, the plurality of switches to control the voltage on the multiphase output further includes determining, by an observer, a generator phase angle; sensing a three-phase current on the three-phase input; converting, by a first converter, the sensed three-phase current into two static direct current signals; and generating, by a first rotator, the observed active current and the observed reactive current based on the two static direct current signals and the generator phase angle.

A further embodiment of any of the foregoing methods, wherein the multiphase output is a three-phase output, and wherein controlling, by the controller, the plurality of switches to control the voltage on the multiphase output further includes generating, by a second rotator, a static voltage reference based on the reference active voltage, the reference reactive voltage, and a reference phase angle; and converting, by a second converter, the static voltage reference into a three-phase reference voltage, wherein the pulse-width modulation algorithm utilizes the three-phase reference voltage to generate the switch control signals.

A further embodiment of any of the foregoing methods, wherein the reference phase angle is selected based on a desired output frequency of the matrix converter.

A further embodiment of any of the foregoing methods, wherein there are no capacitors connected between any phases of the multiphase input.

A further embodiment of any of the foregoing methods, wherein each of the plurality of switches is a bidirectional switch comprising first and second power metal-oxide-semiconductor field-effect transistors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A matrix converter system comprising:
    a matrix converter that includes a plurality of switches, the matrix converter connected between a multiphase input and a multiphase output;
    a plurality of output capacitors connected between the multiphase output and ground;
    a generator connected to the multiphase input, wherein the generator includes internal inductances;
    a controller comprising:
        a pulse-width modulation circuit configured to execute a pulse width modulation algorithm to generate switch control signals for the plurality of switches to control the active current and the reactive current from the generator; and
        a first regulator configured to receive a desired voltage magnitude and an observed voltage magnitude, wherein the observed voltage magnitude is a magnitude of a voltage on the multiphase output, and wherein the first regulator circuit is configured to output a desired active current; and
    wherein the controller is configured to control the plurality of switches to control active current and reactive current from the generator based on the internal inductances of the generator, and wherein the active and reactive currents are controlled to charge the plurality of output capacitors.

2. The system of claim 1, wherein the pulse-width modulation circuit is further configured to output a signal indicative of saturation of the pulse-width modulation algorithm, and wherein the controller further comprises:
    a desaturation module configured to generate a reference delta reactive current based on the signal indicative of saturation;
    an adder configured to output a reactive current command based on the desired reactive current and the reference delta reactive current;
    a second regulator configured to receive the reactive current command and an observed reactive current, and generate a reactive current voltage; and
    a third regulator configured to receive the desired reactive current and an observed active current, and generate an active current voltage.

3. The system of claim 1, wherein each of the plurality of switches is a bidirectional switch comprising first and second power metal-oxide-semiconductor field-effect transistors.

4. The system of claim 1, further comprising an energy damp circuit connected only to the multiphase input.

5. The system of claim 1, wherein there are no capacitors connected between any phases of the multiphase input.

6. The system of claim 2, wherein the multiphase input is a three-phase input, and wherein the controller further comprises:
    an observer configured to determine a generator phase angle;
    a first converter configured to convert a sensed three-phase current on the three-phase input into two static direct current signals; and
    a first rotator configured to output the observed active current and the observed reactive current based on the two static direct current signals and the generator phase angle.

7. The system of claim 6, wherein the controller further comprises:
    a second rotator configured to output a static voltage reference based on the reference active voltage, the reference reactive voltage, and a reference phase angle; and
    a second converter configured to convert the static voltage reference into a three-phase reference voltage, wherein the pulse-width modulation algorithm utilizes the three-phase reference voltage to generate the switch control signals.

8. The system of claim 7, wherein the reference phase angle received by the second rotator is selected based on a desired output frequency of the matrix converter.

9. A method of controlling a matrix converter, wherein the matrix converter includes a plurality of switches and is connected to receive power from a generator at a multiphase input of the matrix converter, and wherein a plurality of capacitors are connected to a multiphase output of the matrix converter, the method comprising:
    controlling, by a controller, the plurality of switches to generate reactive current using internal inductances of the generator;
    controlling, by the controller, the plurality of switches to generate active current by controlling voltage on the multiphase output, wherein controlling the plurality of switches comprises:
        generating, by the controller, a desired voltage magnitude and a desired reactive current;

sampling, by the controller, an observed voltage magnitude on the multiphase output of the matrix converter;

receiving, by a first regulator, the desired voltage magnitude and the observed voltage magnitude; and generating, by the first regulator, a desired active current; and controlling, by the controller, the plurality of switches to control the voltage on the multiphase output based on the active current and the reactive current by controlling, by a pulse-width modulation circuit, the plurality of switches using a pulse-width modulation algorithm.

10. The method of claim 9, wherein controlling, by the controller, the plurality of switches to generate reactive current comprises controlling the plurality of switches to provide short circuit connections between phases of the multiphase input.

11. The method of claim 9, wherein controlling, by the controller, the plurality of switches to control the voltage on the multiphase output further comprises:

generating, by the pulse-width modulation circuit, a signal indicative of saturation of the pulse-width modulation algorithm;

generating, by a desaturation module, a reference delta reactive current based on the signal indicative of saturation;

generating, by an adder, a reactive current command based on the desired reactive current and the reference delta reactive current;

generating, by a second regulator, a reactive current voltage using the reactive current command and an observed reactive current; and generating, by a third regulator, an active current voltage using the desired reactive current and an observed active current.

12. The method of claim 9, wherein there are no capacitors connected between any phases of the multiphase input.

13. The method of claim 9, wherein each of the plurality of switches is a bidirectional switch comprising first and second power metal-oxide-semiconductor field-effect transistors.

14. The method of claim 11, wherein the multiphase input is a three-phase input, and wherein controlling, by the controller, the plurality of switches to control the voltage on the multiphase output further comprises:

determining, by an observer, a generator phase angle;

sensing a three-phase current on the three-phase input;

converting, by a first converter, the sensed three-phase current into two static direct current signals; and generating, by a first rotator, the observed active current and the observed reactive current based on the two static direct current signals and the generator phase angle.

15. The method of claim 14, wherein the multiphase output is a three-phase output, and wherein controlling, by the controller, the plurality of switches to control the voltage on the multiphase output further comprises:

generating, by a second rotator, a static voltage reference based on the reference active voltage, the reference reactive voltage, and a reference phase angle; and converting, by a second converter, the static voltage reference into a three-phase reference voltage, wherein the pulse-width modulation algorithm utilizes the three-phase reference voltage to generate the switch control signals.

16. The method of claim 15, wherein the reference phase angle is selected based on a desired output frequency of the matrix converter.

* * * * *